(12) United States Patent
Wiley

(10) Patent No.: US 8,205,835 B2
(45) Date of Patent: Jun. 26, 2012

(54) SYSTEMS AND METHODS FOR AERIAL CABLED TRANSPORTATION

(76) Inventor: Jeremy A. Wiley, Atlanta, GA (US)

(*) Notice: Subject to any disclaimer, the term of this patent is extended or adjusted under 35 U.S.C. 154(b) by 433 days.

(21) Appl. No.: 12/465,712

(22) Filed: May 14, 2009

(65) Prior Publication Data

US 2010/0288872 A1 Nov. 18, 2010

(51) Int. Cl.
*B64B 1/50* (2006.01)

(52) U.S. Cl. .................. 244/127; 244/1 R; 244/33

(58) Field of Classification Search .............. 244/127, 244/33, 1 R
See application file for complete search history.

(56) References Cited

U.S. PATENT DOCUMENTS

| | | | | |
|---|---|---|---|---|
| 3,807,577 A | * | 4/1974 | Bell | 414/23 |
| 3,865,251 A | * | 2/1975 | Langford | 244/33 |
| 4,055,316 A | * | 10/1977 | Chipper et al. | 244/33 |
| 5,080,302 A | * | 1/1992 | Hoke | 244/33 |
| 6,010,093 A | * | 1/2000 | Paulson | 244/30 |
| 6,145,679 A | * | 11/2000 | Walters | 212/76 |
| 6,494,143 B1 | * | 12/2002 | Bolonkin | 104/173.1 |
| 6,792,872 B1 | * | 9/2004 | Valdespino | 104/22 |
| 6,809,495 B2 | * | 10/2004 | Rodnunsky | 318/649 |
| 6,978,720 B2 | | 12/2005 | Johnson | |
| 7,046,934 B2 | | 5/2006 | Badesha et al. | |
| 7,183,663 B2 | | 2/2007 | Roberts et al. | |
| 7,207,277 B2 | | 4/2007 | Rodnunsky | |
| 7,927,057 B2 | * | 4/2011 | Johnson | 244/127 |

OTHER PUBLICATIONS

Fitzsimmons, Joeleff T.; Veidt, Bruce; Dewdney, Peter E., "Steady-State Analysis of the Multi-Tethered Aerostat Platform for the Large Adaptive Reflector Telescope", Online at archive of www.drao.nrc.ca/science/ska/other_formats/munich_joeleff_w_pageno.pdf, Mar. 2000.

* cited by examiner

*Primary Examiner* — Tien Dinh
*Assistant Examiner* — Steven Hawk
(74) *Attorney, Agent, or Firm* — Bradley D. Crose; Crose Law LLC

(57) ABSTRACT

The technology described herein provides for the creation of an atmospherically-lifted multi-tethered structure in a semi-stationary position in the atmosphere, which supports cabled cargo handling operations within the three-dimensional space beneath the structure, allowing cargo loads to move directly from source to destination in that same space (between the ground and the atmospherically-suspended structure itself). The design combines a highly configurable aerial platform with the usefulness of complex cargo transportation systems to enable transit both at high speeds over long distances, and at low speeds on the localized level. Constant atmospheric lift from buoyancy and wind effects allows for a flexible transportation infrastructure over a broad three-dimensional area.

17 Claims, 10 Drawing Sheets

SYSTEMS AND METHODS FOR AERIAL CABLED TRANSPORTATION

FIELD OF THE INVENTION

The technology described herein relates generally to the fields of aerostats, cable robotics, tension structures, material handling systems, aerial rail systems, and cargo transportation. More specifically, this technology relates to a cabled apparatus suspended by atmospheric lift as a semi-stationary structure to enable scalable and modular aerial cabled cargo transportation.

BACKGROUND OF THE INVENTION

Transportation is a critical part of the entire global economy. However, current ground transportation requires negotiation of significant natural and man-made obstacles occurring along the ground surface in order to transit from a specific source to a specific destination. This requires the creation and maintenance of expansive physical ground infrastructures, including roads, bridges, interchanges, waterways, ports, and a number of other pathways and structures, each having high economic, social and environmental implications.

Although an extensive number of concepts have proposed unique vehicles, from Harry Pettit's 1908 drawing "King's Dream of New York" (See for example, http://www.skyscraper.org/EXHIBITIONS/FUTURE_CITY/NEW_YORK_MODERN/w alkthrough_1900.php) to the many iterations of the flying car, or enormous megastructures to address the global need to realize cargo transportation both at the high-speed, long-distance level and the low-speed, localized level, none take advantage of the buoyancy and wind speed that provide constant lift to balloon and kite systems in the atmosphere to statically support the mechanics of a cabled aerial transportation system, in the same manner as does the technology described herein.

In U.S. Pat. No. 6,494,143 on the movement of vehicles, Dr. Alexander Bolonkin discloses an atmospherically-suspended conveyance cable design kept in relatively stationary position that can be combined together to form interconnected conveyance cable networks for long-distance transportation with various destination ports. Because Bolokin's concept is for high-speed, large-scale applications only, the design requires at least a large portion of the lift and stability over the system to come from the flight vehicles themselves, which have complexity nearing current aircraft designs, and require runway infrastructures for takeoff and landing. This design lacks the capacity for the modularity and scalability that allows for lower-speed, more localized cargo transfer because of the specified requirements for independent flight vehicles accelerated by separate ground-based acceleration devices, where the accelerated flight vehicles then attach to an atmospherically-suspended conveyance cable by a single separate vehicle cable.

Balloon logging systems, employing ground-winched cables to haul a balloon and the load carried beneath it to move cargo from point to point, have been in use around the world since the 1950's. However, none of these systems deals with more than one movement of cargo at a time, or has designs with conveyance cable-type cargo transit for lower cycle times and higher volumes. One balloon logging concept, studied and successfully prototyped by several graduate students at Oregon State University (OSU) in 1984, calls for a single-load, semi-stationary design. This design was based off of Mr. John Bell's patent (U.S. Pat. No. 3,807,577) on aerial load lifting, which disclosed a semi-stationary atmospherically-suspended haulback cable system designed to transport one load at a time with a ground-attached loop and a single pendulum line extending from the apex of the semi-stationary structure to support a majority of the load's weight. The design creates essentially the opposite of Bolonkin's problem by focusing on low-speed, localized cargo transfer without consideration for high-speed, long-distance cargo transport over multiple interconnected systems, and has specific system requirements for a ground-mounted haulback cable cargo handling system, a single pendulum line, balloon suspension, and a central power source that is limited to ground stations.

Advanced traction kite systems have recently been commercialized to aid in a number of heavy industry applications including ship propulsion, but even if they have been scaled for designs dragging loads on the scale of hundreds of tons, they have not been used as stationary platforms to suspend cabled cargo transportation. High-tech adaptive flight control systems have allowed robotic systems, like the aforementioned traction kite systems and other automated parafoil systems, to realize significantly stable platforms. However, these systems have not been used as atmospherically-suspended, semi-stationary platforms for cabled cargo transportation.

Multi-axial, flexible-cable, robotic systems, such as the NIST Robocrane and advanced camera systems, such as the CableCam and SkyCam, have demonstrated the cargo handling capabilities of cabled robotics in three-dimensional space. In related industries, a number of other complex cargo handling capabilities, like those used in automated storage and retrieval systems (AS/RS) in material handling facilities, have shown that the applications of such systems are useful, extensive, and diverse. But even if these systems extensively demonstrate the usefulness of complex cargo transportation, none of them have been used in conjunction with stationary atmospherically-suspended platforms.

Related patents known in the art include the following. U.S. Pat. No. 6,809,495, issued to Rodnunsky on Oct. 26, 2004, discloses a system and method for moving objects within three dimensional space. U.S. Pat. No. 7,207,277, issued to Rodnunsky on Apr. 24, 2007, discloses a system and method for moving objects within two-dimensional space. U.S. Pat. No. 3,807,577, issued to Bell on Apr. 30, 1974, discloses an aerial load lifting and transporting method and system. U.S. Pat. No. 6,494,143, issued to Bolonkin on Dec. 17, 2002, discloses a system and method for the movement of vehicles. U.S. Pat. No. 7,046,934, issued to Badesha et al. on May 16, 2006, discloses an optical communication system using a high altitude tethered balloon. U.S. Pat. No. 5,080,302, issued to Hoke on Jan. 14, 1992, discloses a method and apparatus for aerially transporting loads. U.S. Pat. No. 6,978,720, issued to Johnson on Dec. 27, 2005, discloses a gondola railcar construction. U.S. Pat. No. 7,183,663, issued to Roberts et al. on Feb. 27, 2007, discloses precisely controlled flying electric generators.

Related non-patent literature known in the art includes the following. In "Steady-State Analysis of the Multi-Tethered Aerostat Platform for the Large Adaptive Reflector Telescope" available online at archive of www.drao.nrc.ca/science/ska/other_formats/munich_joeleff_w_pageno.pdf, Fitzsimmons, Veidt, and Dewdney disclose the use of a multi-tethered aerostat platform in a particular application for a telescope.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides for the creation of an atmospherically-lifted multi-tethered structure in a semi-stationary position in the atmosphere, which supports cabled cargo handling operations within the three-dimensional space beneath the structure, allowing cargo loads to move directly from source to destination in that same space (between the ground and the atmospherically-suspended structure itself). The design combines a highly configurable aerial platform with the usefulness of complex cargo transportation systems to enable transit both at high speeds over long distances, and at low speeds on the localized level. Constant atmospheric lift from buoyancy and wind effects allows for a flexible transportation infrastructure over a broad three-dimensional area.

Highly efficient directly connected mechanically and electrically-powered components are more applicable in this connected infrastructure, whereas in vehicle-based transportation systems, energy storage and consumption devices struggle inefficiently within the confines of their platforms to perform adequately. The consolidation of complex cargo handling systems onto one interconnected, scalable, modular, aerial platform allows for more accessible transportation over both small and large geographical areas by moving cargo over the tops of ground obstacles more directly from origin to destination, supporting more than one load at a time for significantly lower cycle times and higher volumes.

In one exemplary embodiment, the technology described herein provides an aerial cabled transportation system. The aerial cabled transportation system includes: at least one atmospheric lifting device, configured to provide an upward lift sufficient to support a load to be transported between a loading site and a discharge site, and configured to maintain an approximate relative position in the atmosphere over an extended period of time; at least three anchored guy lines coupled to at least one apex connectivity point to the at least one atmospheric lifting device, each guy line radiating downwardly to one of at least three anchors, each at an anchor connectivity point; and at least three aerial payload support tethers each coupled to one of the at least three anchored guy lines, each at an anchor guy line variable connectivity point, and radiating inwardly to at least one aerially suspended cargo handling module, each aerial payload support tether coupled to one of at least three cargo handling module connectivity points, the cargo-handling module configured to perform a plurality of cargo handling tasks to aerially transport loads between the loading site and the discharge site.

When the system is erected, the tension on the at least three anchored guy lines creates a semi-stationary structure for lifting into the air the at least three aerial payload support tethers and the at least one cargo handling module, such that the system performs a plurality of transportation movements within a geometric three-dimensional working area.

The aerial cabled transportation system provides that any of the aerially suspended connectivity points, which include the apex connectivity point, the anchor guy line variable connectivity points, and the cargo handling module connectivity points, can further include one of a winch, an auger, a tensioner, and a dampener to facilitate movement.

The aerial cabled transportation system can include at least one pendulum line configured to connect the at least one cargo handling module to the apex connectivity point.

The aerial cabled transportation system can include a controller configured to remotely, operatively control a plurality of movements and functions of the aerially suspended cargo handling module within the geometric three-dimensional working area of the aerial cabled transportation system.

The at least one cargo handling module is configured to perform a plurality of payload switching operations and for interconnectivity with a ground-based material-handling system.

The aerial cabled transportation system provides that any of the connectivity points, which includes apex connectivity points, anchor guy line variable connectivity points, anchor connectivity points, and cargo handling module connectivity points, can further include a pulley, a winch, an auger, a tensioner, a dampener, and other cable control devices to facilitate movement.

The aerial cabled transportation system can include at least one generally horizontal tension line disposed between, at a first end, one of the group consisting of: the at least three anchors and a supplemental ground anchor, and, at a second end, one of the group consisting of: the at least one apex connectivity point, the anchor guy line variable connectivity points, and the at least three cargo handling module connectivity points.

The atmospheric lifting device can include a lighter-than-air aircraft, a hot-air balloon, a wind-support device, a kite, a parafoil, a rotorcraft, a jet-powered device, a laser-powered beamed-energy device, and a rocket-powered device.

The aerial cabled transportation system can include multiple atmospheric lifting devices configured to collectively provide multiple upward lift forces sufficient to support multiple loads to be transported between any of a loading site, an adjacent aerial cabled transportation system, and a discharge site, and each configured to maintain an approximate relative position in the atmosphere over an extended period of time.

Each of the anchored guy lines, collectively utilized to anchor the atmospheric lifting devices, connects from one or more ground anchor connectivity points to at least one apex connectivity point, the apex connectivity points connecting through a plurality of cable configurations to each of the atmospheric lifting devices such that the system provides appropriate transportation functionality, to perform multiple payload switching operations and for interconnectivity, while the total amount of suspended cable weight is minimized.

When a first apex connectivity point is connected via a cable to a second apex connectivity point, both apex connectivity points also serve, in relation to each another, the equivalent functionality of one of the ground anchor points.

Each cargo handling module can be configured to perform multiple payload switching operations and to interconnect with a second cargo handling module suspended beneath the same aerial cabled transportation system.

The aerial cabled transportation system provides that an aerially suspended cable, which includes anchor guy lines, aerial payload support tethers, horizontal tension lines, and any of multiple interconnection cables between the cargo handling modules, can be disposed between multiple connectivity points, which includes the cargo handling module connectivity points, the apex connectivity point, and the anchor guy line variable connectivity points, and a separate connectivity point, by passing through a pulley at a third connectivity point, to perform the function of a plurality of other cables.

The aerial cabled transportation system provides that at least one of the aerially suspended cables, which includes anchor guy lines, aerial payload support tethers, generally horizontal tension lines, and any of a plurality of interconnection cables between a plurality of cargo handling modules, can further include a conveyance cable loop for carrying cargo up and down its length.

The aerial cabled transportation system provides that at least one of the aerially suspended cables, which includes anchor guy lines, aerial payload support tethers, generally horizontal tension lines, and any of a plurality of interconnections between a plurality of cargo handling modules, can further include a junction between two aerially suspended cables which are intended to attach to the same connectivity point, where the two cables join at mid-point along the distance to the connectivity point, and only one aerially suspended cable connects the junction of the two cables to a terminating connectivity point.

In another exemplary embodiment, the technology described herein provides a method for aerial cabled transportation. The method for aerial cabled transportation includes: raising at least one atmospheric lifting device; configuring the atmospheric lifting device to provide an upward lift sufficient to support a load to be transported between a loading site and a discharge site; configuring the atmospheric lifting device to maintain an approximate relative position in the atmosphere over an extended period of time; coupling, at an apex connectivity point, at least three anchored guy lines to the atmospheric lifting device, each guy line radiating downwardly to one of at least three anchors, each at an anchor connectivity point; coupling one of at least three aerial payload support tethers to one of the at least three anchored guy lines, each at an anchor guy line variable connectivity point, and radiating inwardly to at least one aerially suspended cargo handling module, each aerial payload support tether coupled to one of at least three cargo handling module connectivity points; configuring the cargo-handling module to perform a plurality of cargo handling tasks to aerially transport loads between the loading site and the discharge site; and providing a tension on the at least three anchored guy lines to create a semi-stationary structure for lifting into the air the at least three aerial payload support tethers and the at least one cargo handling module, such that a plurality of transportation movements are performed within a geometric three-dimensional working area.

The method for aerial cabled transportation can further include utilizing at least one pendulum line and connecting the at least one pendulum line to the at least one cargo handling module and to the atmospheric lifting device.

The method for aerial cabled transportation can further include utilizing a controller configured to remotely, operatively control a plurality of movements and functions of the aerially suspended cargo handling module within the geometric three-dimensional working area of the aerial cabled transportation system and operatively moving a plurality of payloads and controlling the plurality of movements and functions of the aerially suspended cargo handling module within the geometric three-dimensional working area, operating at both a high-speed, long-distance level and a low-speed, localized level.

The method for aerial cabled transportation can further include utilizing at least one tension line disposed between one of the anchors and one of the apex connectivity points; utilizing at least one tension line disposed between one of the anchors and one of the aerially suspended cargo handling modules; and utilizing at least one secondary support tether disposed between one of the anchors and one of the at least three anchored guy lines.

The method for aerial cabled transportation can also include subsequently raising a plurality of additional atmospheric lifting devices to expand a coverage area of the aerial cabled transportation system; implementing a plurality of subsequent aerial payload support tethers, cargo handling modules, anchored guy lines, pulleys, tension lines, apex connectivity lines, tension lines, and secondary support tethers; maintaining the plurality of additional atmospheric lifting devices at a plurality of varied heights and a plurality of varied geometric three-dimensional working areas such that a modular, multi-tiered, multi-zone aerial cabled transportation system is erected; and interconnecting the cargo handling modules of various zones to facilitate the transportation of cargo while operating at both a high-speed, long-distance level and a low-speed, localized level.

The method for aerial cabled transportation can further include optically lighting any of a plurality of cables utilized for carrying out the method and electrically charging any of a plurality of cables utilized for carrying out the method.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
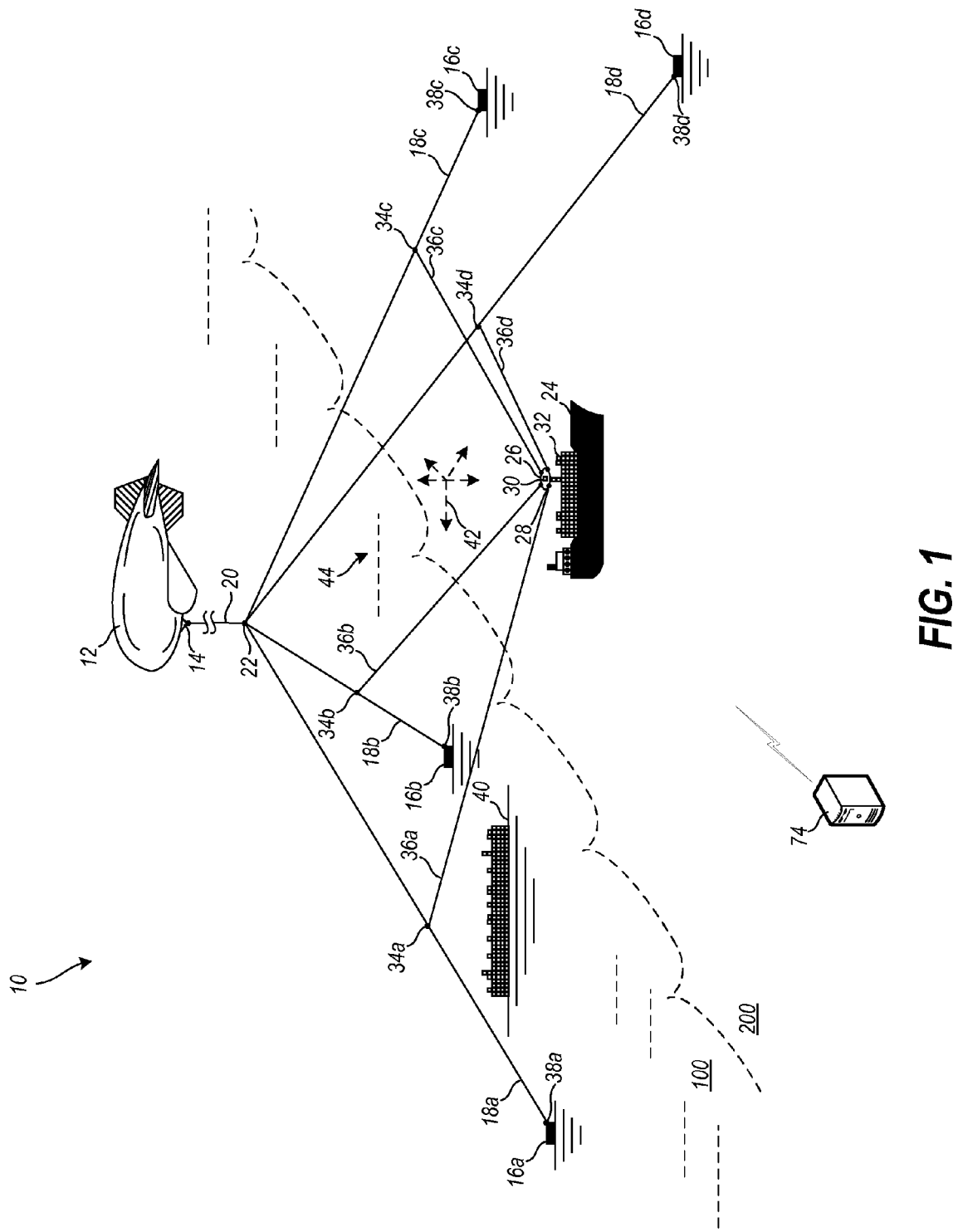
FIG. 1 is a schematic diagram of an aerial cabled transportation system, illustrating, in particular, an atmospheric lifting device, anchored guy lines, aerial support tethers, and an aerially suspended cargo handling module, according to an embodiment of the technology.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides for the creation of an atmospherically-lifted multi-tethered structure in a semi-stationary position in the atmosphere, which supports cabled cargo handling operations within the three-dimensional space beneath the structure, allowing cargo loads to move directly from source to destination in that same space (between the ground and the atmospherically-suspended structure itself). The design combines a highly configurable aerial platform with the usefulness of complex cargo transportation systems to enable transit both at high speeds over long distances, and at low speeds on the localized level. Constant atmospheric lift from buoyancy and wind effects allows for a flexible transportation infrastructure over a broad three-dimensional area.

Highly efficient directly connected mechanically and electrically-powered components are more applicable in this connected infrastructure, whereas in vehicle-based transportation systems, energy storage and consumption devices struggle inefficiently within the confines of their platforms to perform adequately. The consolidation of complex cargo handling systems onto one interconnected, scalable, modular, aerial platform allows for more accessible transportation over both small and large geographical areas by moving cargo over the tops of ground obstacles more directly from origin to destination, supporting more than one load at a time for significantly lower cycle times and higher volumes.

Referring now to the Figures, an aerial cabled transportation system 10 is shown. The aerial cabled transportation system 10 includes an atmospheric lifting device 12. The atmospheric lifting device 12 is configured to provide an upward lift sufficient to support a load 30 to be transported between a loading site and a discharge site (such as ship 24, and/or dock 40), and configured to maintain an approximate relative position in the atmosphere over an extended period of time. The atmospheric lifting device 12 can be an aerostat, a lighter-than-air balloon, a dirigible, a wind-support device, a kite, rotorcraft, a parasail, laser-powered beamed-energy device, or the like, to provide an upward lift sufficient to support a load to be transported between a loading site and a discharge site. The atmospheric lifting device 12 can include a support platform 14 for attachment to tethers, leashes, pulleys, connectivity points, and the like. The aerial cabled transportation system 10 is operable on and over land 100 and sea 200. In various embodiments, laser energy fired from the ground (not shown), from an aerial platform (not shown), or the like, is utilized to superheat air beneath an airborne target plate to cause the plate, its cargo, and in at least one embodiment, the entire system, to suspend in the air. By way of example, energy can be beamed as disclosed at http://www.wired.com/autopia/2009/02/beamed-energy-i/.

The aerial cabled transportation system 10 includes at least three anchored guy lines 18. More than three guy lines 18 can be utilized initially. Additionally, more guy lines 18 can be added subsequently as the aerial cabled transportation system 10 is expanded. Each guy line 18 serves as a mainstay tether. Each guy line 18 radiates downwardly from the atmospheric lifting device 12 to an anchor 16 at an anchor connectivity point 38.

The anchor 16 can include a ground-based anchor, a ship at sea, a docked ship, a sea anchor, a ground vehicle, and so forth. By way of example, the anchor 16 can be a truck 60, a sea anchor 62, a ship at sea 24. The anchor connectivity point 38 can further include a winch, pulley, auger, or the like, to control the guy line 18 it anchors. For example, the length of the guy line 18 in use at a given time can be limited by a winch utilized at the anchor connectivity point 38.

The at least three anchored guy lines 18 are coupled at an apex connectivity point 22. The apex connectivity point 22 can attach directly to the support platform 14 of the atmospheric lifting device 12. Alternatively, a leash 20 can be utilized between the apex connectivity point 22 and the support platform 14 of the atmospheric lifting device 12.

The aerial cabled transportation system 10 includes at least three aerial payload support tethers 36. Each aerial payload support tether 36 is coupled to one of the anchored guy lines 18 at an anchor guy line variable connectivity point 34. The anchor guy line variable connectivity point 34 can further include a winch, pulley, auger, or the like, to control its placement along the aerial payload support tether 36 to which it is coupled. Each aerial payload support tether 36 radiates inwardly to at least one aerially suspended cargo handling module 26.

Figure 9:
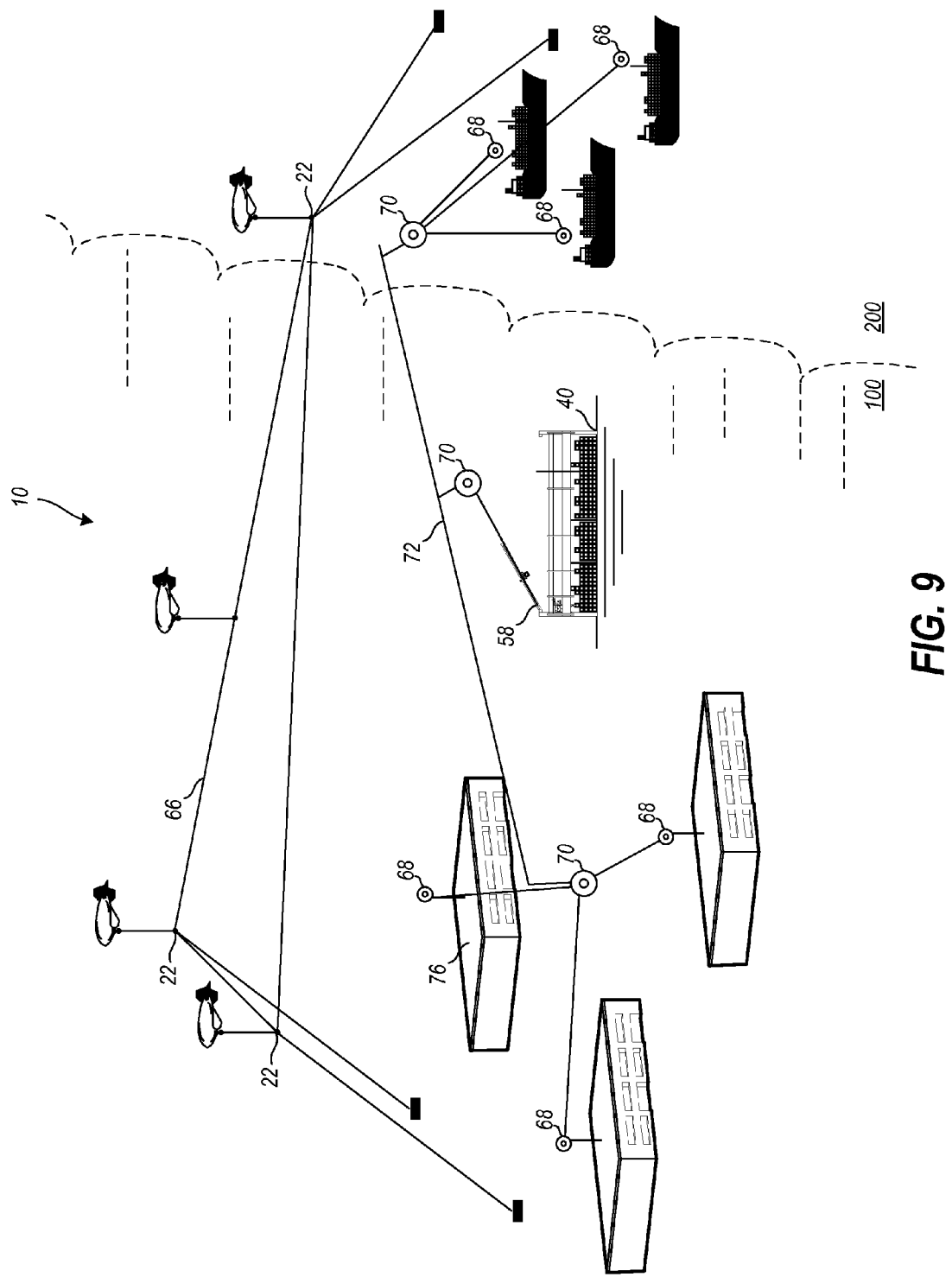
FIG. 9 is a schematic diagram of an aerial cabled transportation system with multiple atmospheric lifting devices utilized for cargo module switching, according to an embodiment of the technology (secondary lines are omitted for clarity)
Figure 10:
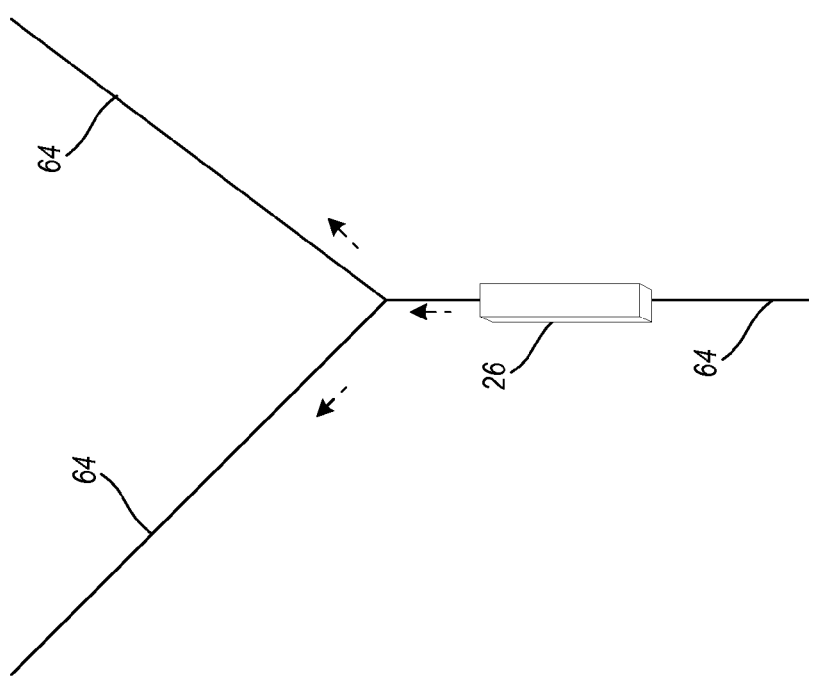
FIG. 10 is a top view schematic diagram of cargo module switching in an aerial cabled transportation system, according to an embodiment of the technology.

Each aerial payload support tether 36 couples to the aerially-suspended cargo handling module 26 at a cargo handling module connectivity point 28. The cargo handling module connectivity point 28 can further include a winch, pulley, auger, or the like, to provide a plurality of means for movement within the aerial cabled transportation system 10. The cargo-handling module 26 is configured to perform a plurality of cargo handling tasks to aerially transport loads between the loading site and the discharge site. By way of example, a load 30 (one or more shipping container) is transported from the loading site (container ship 24 has shipping containers 32) to the discharge site (a dock 40 with a ground-based cargo handling system 58). The cargo-handling module 26 also is configured to interconnect and transfer cargo with other cargo-handling modules 26 in adjacent systems and structures. The cargo-handling module 26 also is configured to perform a plurality of payload switching operations and for interconnectivity with a ground-based material-handling system 58. Interconnectivity with a ground-based material-handling system 58 and building 76 is depicted in FIG. 9, for example.

When the aerial cabled transportation system 10 is erected, the tension on the at least three anchored guy lines 18 creates a semi-stationary structure for lifting into the air the at least three aerial payload support tethers 36 and the at least one cargo handling module 26, such that the system 10 performs a plurality of transportation movements (as represented by arrows 42 and the various axes of movement) within a geometric three-dimensional working area 44.

The aerial cabled transportation system 10 includes a controller 74 configured to remotely, operatively control a plurality of movements 42 and functions of the aerially suspended cargo handling module 26 within the geometric three-dimensional working area 44 of the aerial cabled transportation system 10.

Figure 2:
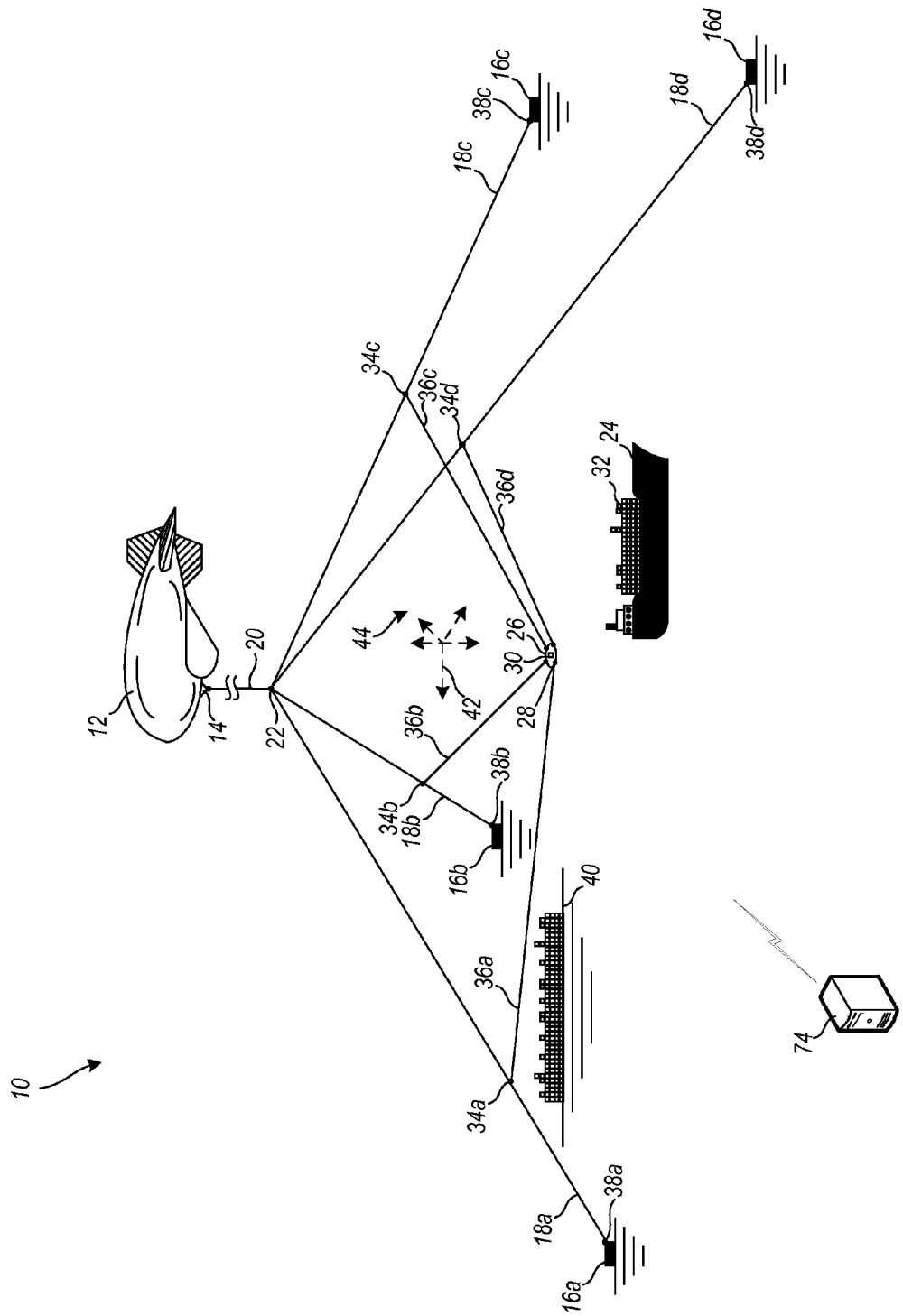
FIG. 2 is a schematic diagram of the aerial cabled transportation system depicted in FIG. 1, further illustrating the three-dimensional geometric working area of the aerial cabled transportation system, according to an embodiment of the technology.
Figure 3:
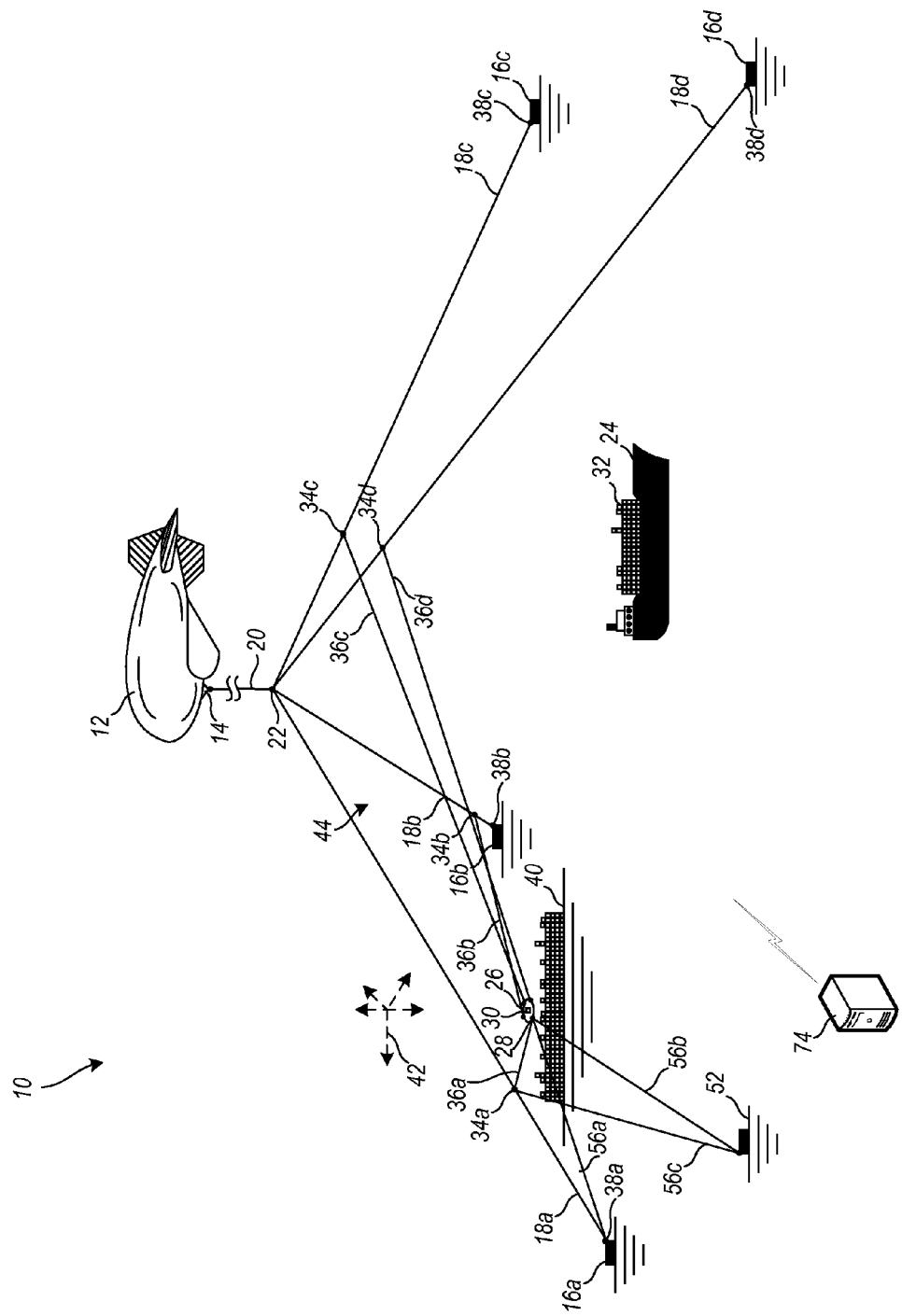
FIG. 3 is a schematic diagram of the aerial cabled transportation system depicted in FIG. 1, further illustrating the three-dimensional geometric working area of the aerial cabled transportation system, according to an embodiment of the technology.
Figure 4:
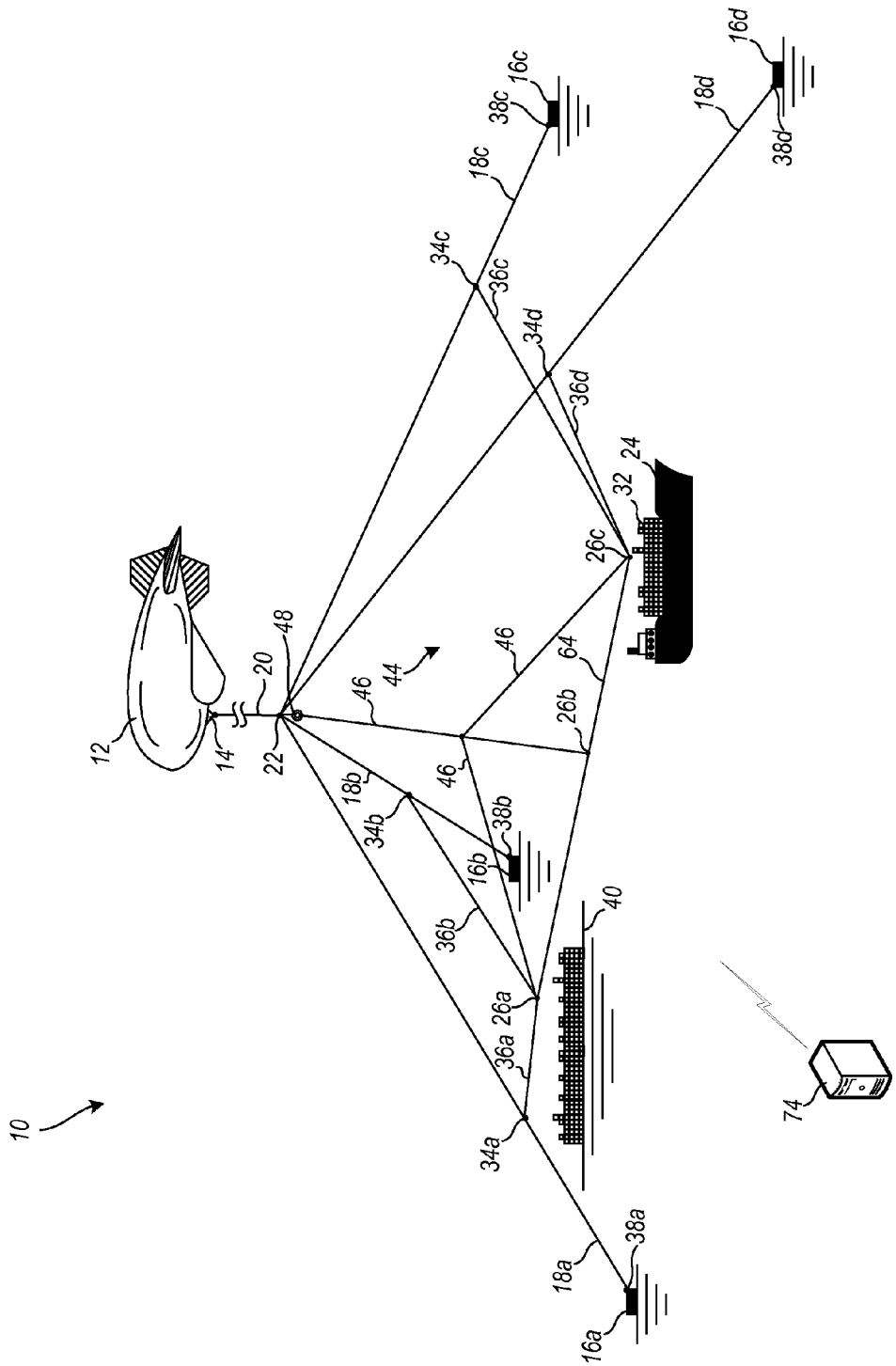
FIG. 4 is a schematic diagram of the aerial cabled transportation system depicted in FIG. 1, further illustrating cargo module spanning and the use of a pendulum line, according to an embodiment of the technology.
Figure 5:
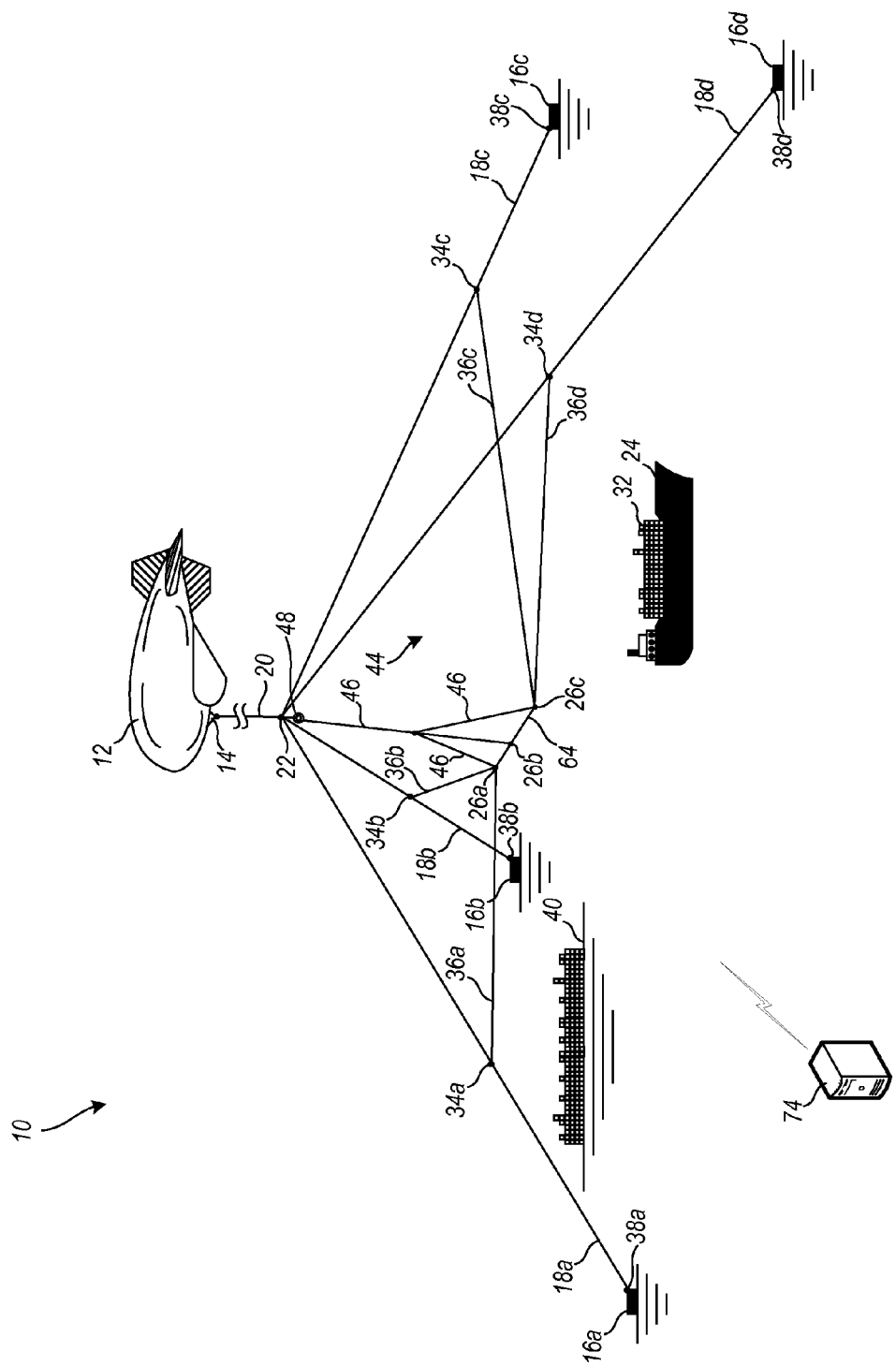
FIG. 5 is a schematic diagram of the aerial cabled transportation system depicted in FIG. 4, further illustrating movement of the cargo module and pendulum line.
Figure 6:
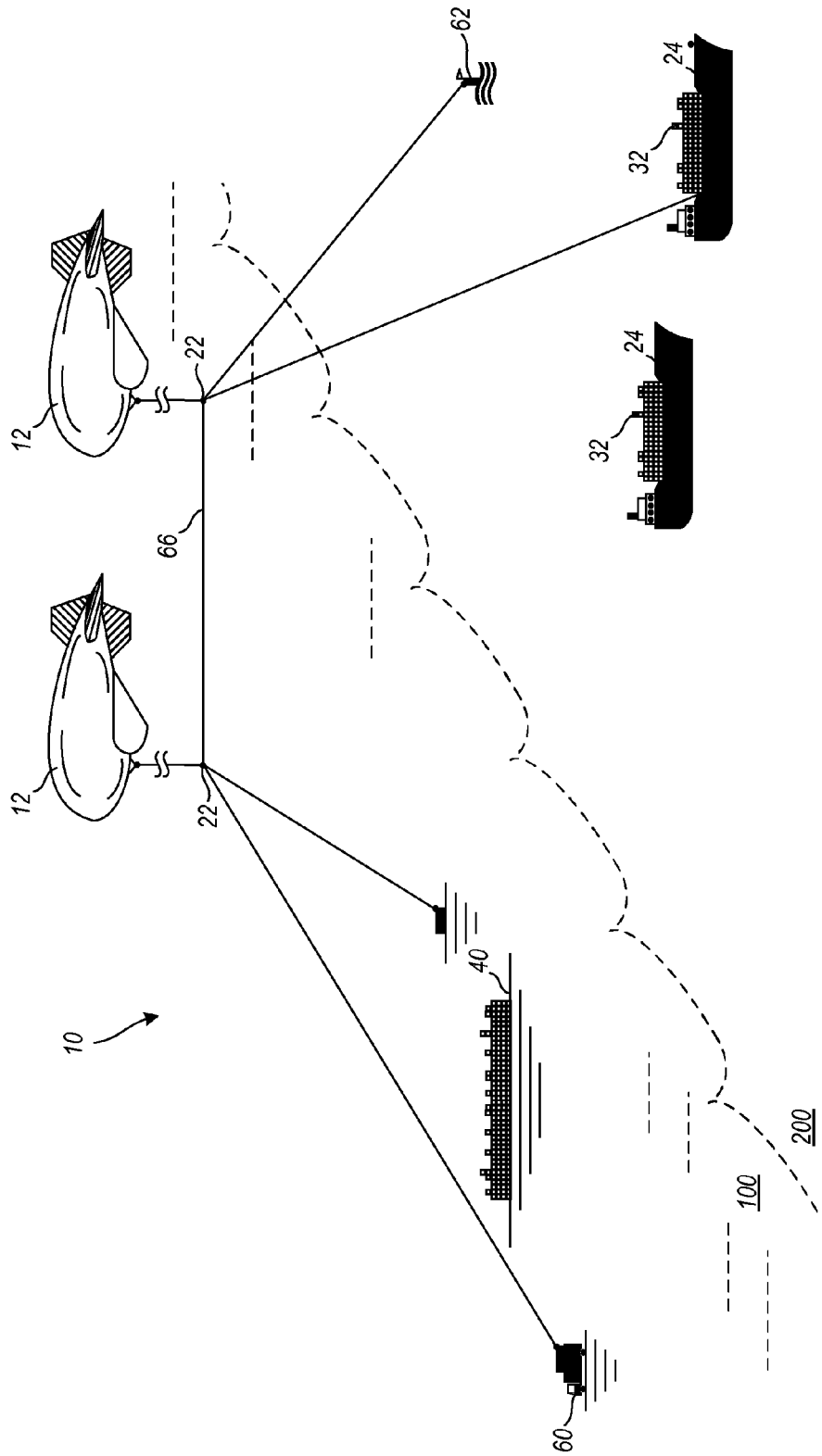
FIG. 6 is a schematic diagram of an aerial cabled transportation system with multiple atmospheric lifting devices in use for structural spanning according to an embodiment of the technology (the various cargo handling modules depicted in earlier figures have been omitted for clarity)
Figure 7:
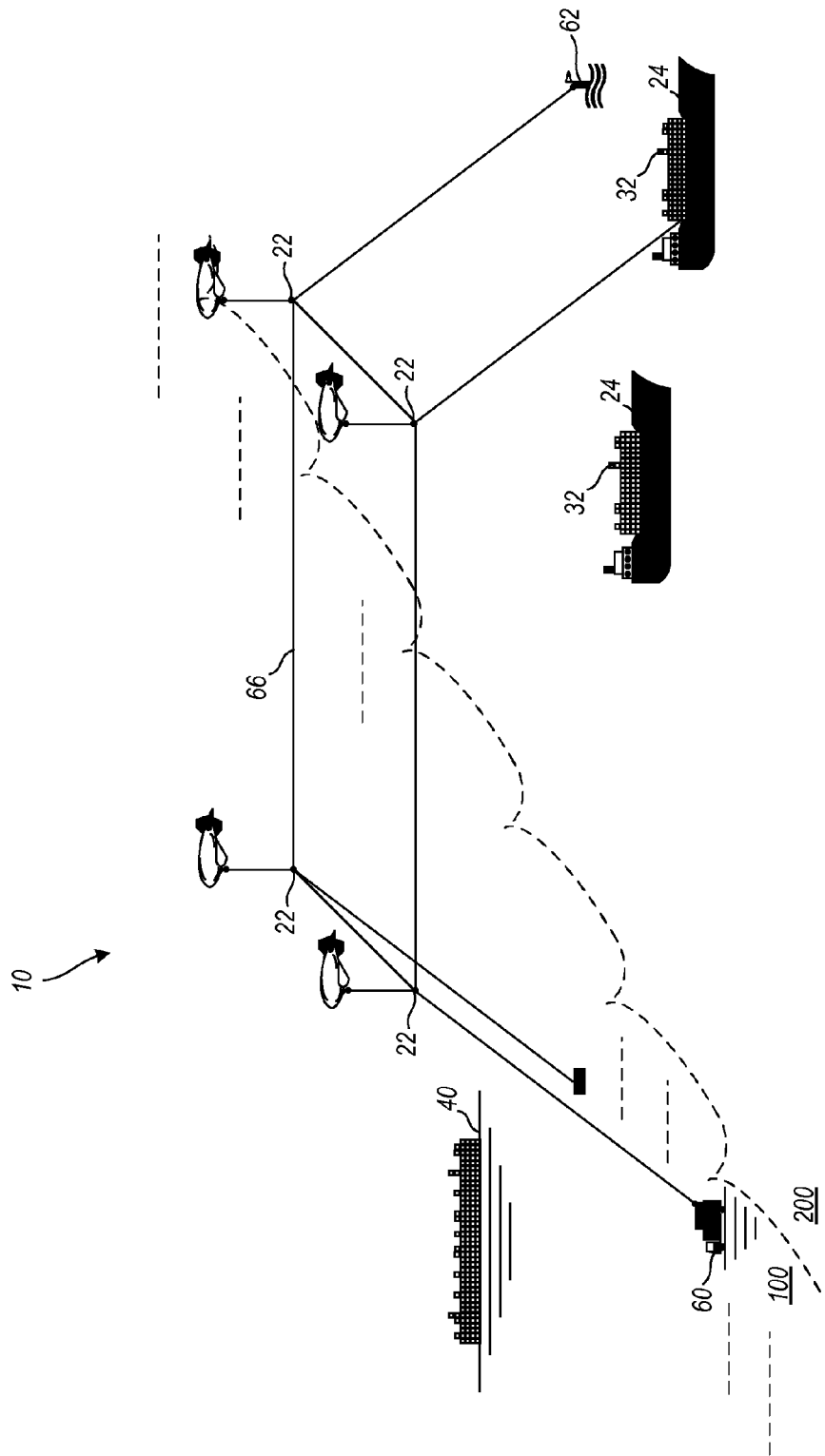
FIG. 7 is a schematic diagram of an aerial cabled transportation system with multiple atmospheric lifting devices in use for structural spanning, according to an embodiment of the technology (the various cargo handling modules depicted in earlier figures have been omitted for clarity)
Figure 8:
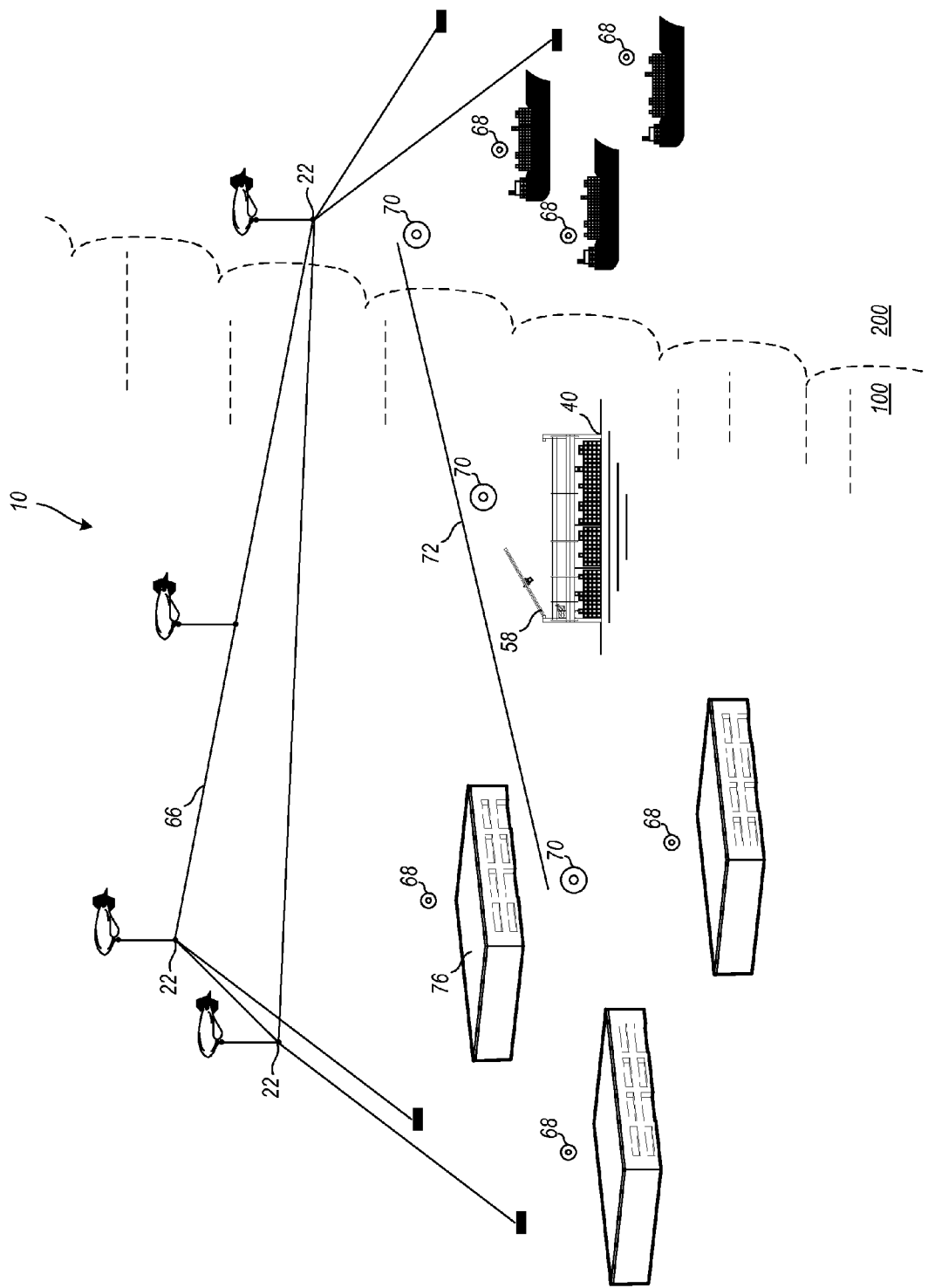
FIG. 8 is a schematic diagram of an aerial cabled transportation system with multiple atmospheric lifting devices utilized for cargo module switching, according to an embodiment of the technology (cargo handling module interconnectivity lines and secondary lines are omitted for clarity)

As depicted in FIGS. 1, 2, and 3, collectively, movement of a cargo handling module 26, and its associated connectivity points and tethers, is performed from a container ship 24 (FIG. 1) to a discharge site 40 (FIG. 3). The cargo handling module 26 is shown in transit in FIG. 2 in a dynamic suspended state.

The aerial cabled transportation system 10 includes at least one pendulum line 46 configured to connect the cargo handling module 26 to the atmospheric lifting device 12. The pendulum line 46 can be utilized to provide additional lift, create a movement in a particular direction, and the like. The pendulum line 46 can be controlled remotely by the controller 74, a source on the ground, a source on a ship 24, and the like. The pendulum line 46 can further include split lines to subdivide the connectivity of the pendulum line 46 to the cargo handling module 26, or other tether in the system. The pendulum line 46 can be utilized in conjunction with a winch 48 at the apex connectivity point 22, or elsewhere along the anchored guy lines 18.

The aerial cabled transportation system 10 is modular, and thus, easily extendable. By way of example, the aerial cabled transportation system 10 can include a supplemental tension line 56 disposed between one of the anchors 16 and one of the aerially suspended cargo handling modules 26, or other tether or connectivity point. As depicted in FIG. 3, the tension lines 56*a*, 54*b*, and 54*c* can be anchored to a supplemental anchor point 52 or to any other existing anchor 16.

The aerial cabled transportation system 10 is modular and can be implemented in a daisy chain and in a multi-tiered manner. Multiple systems 10 can be utilized in conjunction with one another, as depicted in FIG. 6 through 9 (in FIGS. 8 and 9, secondary lines, as defined in earlier drawing figures, are omitted for clarity, and in FIGS. 6-7, the various cargo handling modules depicted in earlier figures have been omitted for clarity). Two or more atmospheric lifting devices 12 can be utilized to support two structures for cargo handling and transportation. In addition to a single aerial cabled transportation system 10 this combined system further includes additional tension lines. Such tension lines can include an apex-to-apex connector 66 and a horizontal tension line 56. Multiple systems 10 can be utilized in conjunction with one another to operate in broad areas. By way of example, operation between multiple systems can move cargo between a first tier 68, a second tier 70, and a third tier 72, such as a conveyance line.

In various embodiments, the modular, multi-tier aerial cabled transportation system 10, or any combination of multiples systems, can utilize the following methods steps:

raising at least one atmospheric lifting device;

configuring the atmospheric lifting device to provide an upward lift sufficient to support a load to be transported between a loading site and a discharge site;

configuring the atmospheric lifting device to maintain an approximate relative position in the atmosphere over an extended period of time;

coupling, at an apex connectivity point, at least three anchored guy lines to the atmospheric lifting device, each guy line radiating downwardly to one of at least three anchors, each at an anchor connectivity point;

coupling one of at least three aerial payload support tethers to one of the at least three anchored guy lines, each at an anchor guy line variable connectivity point, and radiating inwardly to at least one aerially suspended cargo handling module, each aerial payload support tether coupled to one of at least three cargo handling module connectivity points;

configuring the cargo-handling module to perform a plurality of cargo handling tasks to aerially transport loads between the loading site and the discharge site;

providing a tension on the at least three anchored guy lines to create a semi-stationary structure for lifting into the air the at least three aerial payload support tethers and the at least one cargo handling module, such that a plurality of transportation movements are performed within a geometric three-dimensional working area;

utilizing at least one pendulum line;

connecting the at least one pendulum line to the at least one cargo handling module and to the atmospheric lifting device;

utilizing a controller configured to remotely, operatively control a plurality of movements and functions of the aerially suspended cargo handling module within the geometric three-dimensional working area of the aerial cabled transportation system;

operatively moving a plurality of payloads and controlling the plurality of movements and functions of the aerially suspended cargo handling module within the geometric three-dimensional working area, operating at both a high-speed, long-distance level and a low-speed, localized level;

utilizing at least one pulley;

utilizing at least one tension line disposed between one of the anchors and one of the aerially suspended cargo handling modules and routed through the at least one pulley;

utilizing at least one secondary support tether disposed between one of the at least three anchored guy lines and one of the aerially suspended cargo handling modules;

subsequently raising a plurality of additional atmospheric lifting devices to expand a coverage area of the modular, multi-tier aerial cabled transportation system;

implementing a plurality of subsequent aerial payload support tethers, cargo handling modules, anchored guy lines, pulleys, tension lines, and secondary support tethers;

maintaining the plurality of additional atmospheric lifting devices at a plurality of varied heights and a plurality of varied geometric three-dimensional working areas such that a modular, multi-tiered, multi-zone aerial cabled transportation system is erected; and interconnecting the cargo handling modules of various zones to facilitate the transportation of cargo while operating at both a high-speed, long-distance level and a low-speed, localized level.

As will be apparent to those in the art, the cited method steps can be varied in the order performed, and not all method steps must be performed in all embodiments.

In at least one embodiment, one or more aerial cabled transportation systems 10 is utilized to create an "instant port" for use in ports. The instant port can be created by raising an aerostat 12, anchoring multiple tethers 18 from the aerostat 12 to various anchors 16, and finally attaching a cable crane (such as on the cargo handling module 26) to those tethers 18. Aerostats 12 can be deployed from ships by using masts, for example. Anchor line deployment can be by small boats or amphibious vessels, or by using parafoil delivery vehicles (powered or dropped) to extend the lines to their specific ground or sea anchoring points.

With an initial line run, more anchor weight and more robust lines can be added to meet the required system capacity. Part of the structure can be anchored in the sea while part is anchored on land in order to let ships come underneath the anchor lines, whose constant tension now serves as a semi-stationary structure to support the work of any kind of cabled robotics underneath that structure. One way of attaching the crane device is by using the line between the aerostat 12 and the ship to raise up devices to the apex 22 of the anchor cables 18 near the aerostat 12, where they can attach connectors to the anchor lines which move independently up and down the anchor lines (such as with mechanisms like the Atlas Rope Devices disclosed at http://www.atlasdevices.com/) and winch in and out to triangulate the cargo beneath the structure.

Reconfiguring the makeup of the structure itself for various missions and uses is made possible with this modular and extendable platform. By way of example, adding multiple aerostats 12 to support the structure 10 instead of only one aerostat improves the capacity, flexibility, coverage, and survivability of the platform; adding new anchor cables 18 allows a "daisy chain" effect that enables a single system to cover long distances, as well as broad areas; the mobility of the platform, by using parafoil delivery systems to extend new anchor cables to "walk" the platform to new areas for instance, is a way to quickly expand and contract its capacity for more appropriate application.

Structural stability is important, but the stability of the cargo handling robotics beneath the structure is what ultimately impacts the integrity of the cargo. For higher volumes than single cranes can offer, specialized cabled mechanisms can take advantage of many different structural attachment methods. Balloon loggers in the 1980's tested a tag line strategy called a "pendulum-swing" that helped to even out heavy loads on atmospherically-suspended platforms. A more complex version of this concept uses two such pendulum devices moving independently, and meeting at some point underneath the structure to transfer a load between them. This multiple pendulum strategy can be duplicated over many interconnected structures to create a pendulum "daisy chain" to pass cargo along over longer distances than is possible with a simple crane.

Arranging cabled robotics into hierarchical structures can create tiered three-dimensional transportation, where cargo destined for longer distances takes faster routes instead of those that might be more direct. Although these designs are more complex, the weight limitations of the system define that the faster cargo moves across the system, the less weight the system has to carry, and less total weight makes the system as a whole less complex.

In at least one embodiment, an atmospheric lifting device 12 is raised up into the atmosphere from the ground and kept in approximately the same relative position in the atmosphere. Atmospheric lifting devices 12 can be wind support devices, such as kites, parafoils or other structures which use wind effects to generate at least some of their lift, or they can be atmospheric buoyancy devices, such as aerostats, balloons, airships, dirigibles, or other structures which use atmospheric buoyancy to generate at least some of their lift. They can also be powered rotorcraft, or any other device which uses powered flight or harnessed ambient energy to generate lift. They can also be suspended in the air by laser energy fired from the ground, which is utilized to superheat air beneath an airborne target plate to cause the plate, its cargo, and in at least one embodiment, the entire system, to suspend in the air. One example of an atmospheric lifting device is called the Sky-Sails system, which is a towing-kite developed to augment ship propulsion. No matter which type of device is utilized, the purpose of the atmospheric lifting device 12 is to create large amounts of lift for an extended period of time, allowing cables capable of performing cabled transportation to be suspended from that device.

To create the necessary semi-stationary structure, primary anchored guy lines are attached to the atmospheric lifting device in several different ways. When the atmospheric lifting device is first raised, the guy lines can already be attached. A rope-climbing device can scale the tether that was used to raise the atmospheric lifting device.

In at least one embodiment, one or more aerial cabled transportation system 10 is utilized to create a disaster recovery platform. This platform can be used over land, sea, or a combination of varied terrains and surfaces.

Container modules loaded with the kites, tethers, winches, and other equipment necessary to deploy the Instant Port system can be pre-positioned at ports in a global strategy similar to the U.S. pre-positioned fleet. In response to a disaster, the government leases the most expediently deployable nearby container ship and has that ship begin to load the pre-positioned container modules. Concurrently, a specialized response team is flown to that location and boards the ship to prepare it for deployment of the Instant Port as it transits to the disaster site. At a command center, best strategies for anchor establishment are considered and communicated with the on-ship team. Anchors can be carried onboard, made upon arrival (using a mesh bag and onsite materials or a water bladder, for instance), or can be established well before disasters at strategically important locations.

With the system deployed as described above, wide ranges of disaster relief applications are made available:

Ship-to-shore transfer from any size of ship, still in deep water, with no port necessary (especially useful for open container ships);

Immediate emergency access on a highly localized level—search and rescue with a container module would have the same utility as a search and rescue helicopter, and the high mobility of such modules would be useful in other arenas as well, like security;

$C^4ISR$ modules for situational awareness—access for modules to higher altitudes can provide excellent long-distance ground coverage for overhead site surveys by any number of sensors, provide an ideal platform for LOS and NLOS communications with the potential for secure communications from these devices to the ground through fiber-optic tethers (demonstrated by the Johns Hopkins University's Applied Physics Laboratory High Altitude Tethered Balloon project disclosed at http://www.jhuapl.edu/nss/documents/fact_sheets/05-01607%20FS%20HATB.pdf);

Energy generation and distribution modules—new atmospheric positioning abilities may allow for increases in the generation capacity of wind turbines (or even kites), solar energy collectors, and even thermal energy systems; energy distribution by mechanical power transfer (through conveyance cables, or by stored power devices) may be more efficient for transmitting power than through electrified cables; and Heavy-duty, remote area crane operations, where little ground infrastructure is available.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. An aerial cabled transportation system comprising:
   at least one atmospheric lifting device, configured to provide an upward lift sufficient to support a load to be aerially maneuvered within a geometric three-dimensional working area, and configured to be maintained by an application of motive power through a plurality of cabling in an approximate relative position in the atmosphere over an extended period of time;
   at least three anchored guy lines coupled to at least one apex connectivity point to the at least one atmospheric lifting device, each guy line radiating downwardly to one of at least three anchors, each at an anchor connectivity point;
   at least three anchor guy line variable connectivity points, one disposed upon each anchored guy line, wherein each anchor guy line variable connectivity point is configured to apply variable transverse forces upon the attached anchored guy line to facilitate movement of an aerially suspended cargo handling module with general independence from the movement of an atmospheric lifting device; and
   at least three aerial payload support tethers each coupled to one of the at least three anchored guy lines, each at one of the at least three anchor guy line variable connectivity points, and radiating inwardly to at least one aerially suspended cargo handling module, each aerial payload support tether coupled to a cargo handling module connectivity point, the cargo-handling module configured to perform a plurality of cargo handling tasks to aerially maneuver loads within a geometric three-dimensional working area; and
   at least one connectivity point from the group consisting of: the apex connectivity point, one of the at least three anchor guy line variable connectivity points, one of the at least three anchor connectivity points, and the cargo handling module connectivity point, comprises a means of motive force to be applied to at least one selected from the group consisting of: the cargo handling module, the atmospheric lifting device, the apex connectivity point, and one of the at least three anchor guy line variable connectivity points; and
   wherein, when the system is erected, the tension on the at least three anchored guy lines creates a semi-stationary structure for lifting into the air the at least three aerial payload support tethers and the at least one cargo handling module, such that the system performs a plurality of transportation movements within a geometric three-dimensional working area.

2. The aerial cabled transportation system of claim 1, further comprising:
   at least one pendulum line configured to connect the cargo handling module to the apex connectivity point.

3. The aerial cabled transportation system of claim 1, further comprising:
   a controller configured to remotely, operatively control a plurality of movements and functions of at least one from the group consisting of: the aerially suspended cargo handling module, the atmospheric lifting device, the apex connectivity point, and one of the anchor guy line variable connectivity points, within the geometric three-dimensional working area of the aerial cabled transportation system.

4. The aerial cabled transportation system of claim 1, wherein the at least one cargo handling module is configured to perform a plurality of cargo handling operations for interconnectivity with a ground-based material-handling system.

5. The aerial cabled transportation system of claim 1, further comprising:
   at least one supplemental tension line disposed between, at a first end, one of the group consisting of: one of the at least three anchors, and a supplemental anchor, and, at a second end, one of the group consisting of: the apex connectivity point, one of the at least three anchor guy line variable connectivity points, the atmospheric lifting device, and the cargo handling module.

6. The aerial cabled transportation system of claim 1, wherein the atmospheric lifting device is one from the group consisting of: a lighter-than-air aircraft, a hot-air balloon, a wind-support device, a kite, a parafoil, a rotorcraft, a jet-powered device, a laser-powered beamed-energy device, and a rocket-powered device.

7. The aerial cabled transportation system of claim 1, further comprising:
   a plurality of atmospheric lifting devices configured to collectively provide a plurality of upward lift forces sufficient to support at least one load to be aerially maneuvered within a geometric three-dimensional working area, and each configured to maintain an approximate relative position in the atmosphere over an extended period of time;
   wherein each of the at least three anchored guy lines, collectively utilized to anchor the plurality of atmospheric lifting devices, connects from at least one anchor connectivity point to at least one apex connectivity point, the apex connectivity points connecting through a plurality of cable configurations to each of the atmospheric lifting devices such that the system provides appropriate transportation functionality within a geometric three-dimensional working area, while the total amount of suspended cable weight is minimized;
   wherein, when a first apex connectivity point is connected via a cable to a second apex connectivity point, both apex connectivity points also serve, in relation to each another, the equivalent functionality of one of the anchor points.

8. The aerial cabled transportation system of claim 1, wherein at least one of the at least one cargo handling modules is configured to perform a plurality of cargo handling operations for interconnectivity with a second cargo handling module suspended beneath one from the group consisting of: the same aerial cabled transportation system and a second interconnected aerial cabled transportation system.

9. The aerial cabled transportation system of claim 1, wherein at least one aerially suspended cable, which is one from the group consisting of: one of the at least three anchor guy lines, one of the at least three aerial payload support tethers, the supplemental tension line, the pendulum line, any of a plurality of interconnection cables between a plurality of atmospheric lifting devices, and any of a plurality of interconnection cables between a plurality of cargo handling modules, is disposed between a plurality of the connectivity points, which is one from the group consisting of: one of the at least three anchor connectivity points, the cargo handling module connectivity points, the apex connectivity point, and one of the at least three anchor guy line variable connectivity points, and a separate connectivity point by passing through a cable pass-through, which is one from the group: a pulley and a cable guide, at a third connectivity point, to perform the function of a plurality of other cables.

10. The aerial cabled transportation system of claim 1, wherein at least one of the aerially suspended cables, which is one from the group consisting of: one of the at least three anchor guy lines, one of the at least three aerial payload support tethers, the supplemental tension line, the pendulum line, any of a plurality of interconnection cables between a plurality of atmospheric lifting devices, and any of a plurality of interconnection cables between a plurality of cargo handling modules, further comprises a conveyance cable loop for transferring force up and down its length.

11. The aerial cabled transportation system of claim 1, wherein at least one of the aerially suspended cables, which is one from the group consisting of: one of the at least three anchor guy lines, one of the at least three aerial payload support tethers, the supplemental tension line, the pendulum line, any of a plurality of interconnection cables between a plurality of atmospheric lifting devices, and any of a plurality of interconnection cables between a plurality of cargo handling modules, further comprises a junction between two aerially suspended cables which are intended to attach to the same connectivity point, where the two cables join at midpoint along the distance to the connectivity point, and only one aerially suspended cable connects the junction of the two cables to a terminating connectivity point.

12. A method for aerial cabled transportation, the method comprising:
   raising at least one atmospheric lifting device;
   configuring the atmospheric lifting device to provide an upward lift sufficient to support a load to be aerially maneuvered within a geometric three-dimensional working area;
   configuring the atmospheric lifting device to be maintained by an application of motive power through a plurality of cabling in an approximate relative position in the atmosphere over an extended period of time;
   coupling, at an apex connectivity point, at least three anchored guy lines to the atmospheric lifting device, each guy line radiating downwardly to one of at least three anchors, each at an anchor connectivity point;
   configuring at least three anchor guy line variable connectivity points, one upon each anchored guy line, to apply variable transverse forces upon the attached anchored guy line to facilitate movement of an aerially suspended cargo handling module with general independence from the movement of an atmospheric lifting device;
   coupling one of at least three aerial payload support tethers to one of the at least three anchored guy lines, each at one of the at least three anchor guy line variable connectivity points, and radiating inwardly to at least one aerially suspended cargo handling module, each aerial payload support tether coupled to one of at least one cargo handling module connectivity points;
   configuring the cargo handling module to perform a plurality of cargo handling tasks to aerially maneuver loads within a geometric three-dimensional working area;
   configuring at least one connectivity point from the group consisting of: the apex connectivity point, one of the at least three anchor guy line variable connectivity points, one of the at least three anchor connectivity points, and the cargo handling module connectivity point, to provide a means of motive force to be applied to at least one selected from the group consisting of: the cargo handling module, the atmospheric lifting device, the apex connectivity point, and one of the at least three anchor guy line variable connectivity points; and
   providing a tension on the at least three anchored guy lines to create a semi-stationary structure for lifting into the air the at least three aerial payload support tethers and the at least one cargo handling module, such that a plurality of transportation movements are performed within a geometric three-dimensional working area.

13. The method for aerial cabled transportation of claim 12, further comprising:
   utilizing at least one pendulum line; and
   connecting the pendulum line to the cargo handling module and to the apex connectivity point.

14. The method for aerial cabled transportation of claim 12, further comprising:
   utilizing a controller configured to remotely, operatively control a plurality of movements and functions of at least one from the group consisting of: the aerially suspended cargo handling module, the atmospheric lifting device, the apex connectivity point, and one of the anchor guy line variable connectivity points, within the geometric three-dimensional working area of the aerial cabled transportation system; and
   operatively moving a plurality of payloads and controlling the plurality of movements and functions of at least one from the group consisting of: the aerially suspended cargo handling module, the atmospheric lifting device, the apex connectivity point, and one of the anchor guy line variable connectivity points, within the geometric three-dimensional working area, operating at any speed, including a high-speed, long-distance level and a low-speed, localized level.

15. The method for aerial cabled transportation of claim 12, further comprising:
   utilizing at least one supplemental tension line disposed between one of the one of the group consisting of: at least three anchors and a supplemental anchor, and the apex connectivity point;
   utilizing at least one supplemental tension line disposed between one of the group consisting of: one of the at least three anchors and a supplemental anchor, and the atmospheric lifting device;
   utilizing at least one supplemental tension line disposed between one of the group consisting of: one of the at least three anchors and a supplemental anchor, and the aerially suspended cargo handling modules; and
   utilizing at least one supplemental tension line disposed between one of the group consisting of: one of the at least three anchors and a supplemental anchor, and one of the at least three anchored guy lines.

16. The method for aerial cabled transportation of claim 12, further comprising:

subsequently raising a plurality of additional atmospheric lifting devices to expand the payload capacity or coverage area of the aerial cabled transportation system;

implementing a plurality of subsequent aerial payload support tethers, cargo handling modules, anchored guy lines, pulleys, supplemental tension lines, pendulum lines, and interconnection cables;

maintaining the plurality of additional atmospheric lifting devices at a plurality of varied heights and a plurality of varied geometric three-dimensional working areas such that a modular, multi-tiered, multi-zone aerial cabled transportation system is erected; and interconnecting the cargo handling modules of various zones to facilitate the transportation of cargo while operating at any speed, including high-speed, long-distance level and a low-speed, localized level.

17. The method for aerial cabled transportation of claim 12, wherein the cables optically lighting any of a plurality of cables utilized for carrying out the method; and electrically charging any of a plurality of cables utilized for carrying out the method.

* * * * *